United States Patent [19]

Campbell

[11] Patent Number: 4,819,956

[45] Date of Patent: Apr. 11, 1989

[54] CONVERTIBLE SIDECAR/TRAILER

[76] Inventor: John M. Campbell, 8795 Big Bend Rd., Martinsville, Ind. 46151

[21] Appl. No.: 48,244

[22] Filed: May 11, 1987

[51] Int. Cl.[4] .............................................. B62K 27/00
[52] U.S. Cl. .................................... 280/203; 280/7.14; 280/30; 280/204; 280/415.1
[58] Field of Search ....................... 280/7.12, 7.14, 24, 280/203, 204, 421, 415 R, 30; 180/190; 296/35.3, 182; 414/498

[56] References Cited

U.S. PATENT DOCUMENTS

| | | | |
|---|---|---|---|
| 1,203,612 | 11/1916 | Marley | 280/203 |
| 1,220,247 | 3/1917 | Lydamore et al. | 280/12.1 |
| 1,633,279 | 6/1927 | Scala | 280/203 |
| 3,503,620 | 3/1970 | Koskovich et al. | 280/415 R |
| 3,650,570 | 3/1972 | Meeks | 280/421 |
| 4,389,066 | 6/1983 | Weir et al. | 280/24 |
| 4,471,973 | 9/1984 | Beekman | 280/204 |

FOREIGN PATENT DOCUMENTS

| | | | |
|---|---|---|---|
| 572683 | 12/1931 | Fed. Rep. of Germany | 280/203 |
| 921937 | 4/1982 | U.S.S.R. | 280/203 |
| 268349 | 8/1927 | United Kingdom | 280/204 |

OTHER PUBLICATIONS

Sears Roebuck and Company, 1986-87, Shoreline Deluxe Trailer, p. 38.
Sears Roebuck and Company, Specialog, 1986-87, Terraplane, p. 3.

Primary Examiner—Charles A. Marmor
Assistant Examiner—Eric Culbreth
Attorney, Agent, or Firm—Woodard, Emhardt, Naughton, Moriarty & McNett

[57] ABSTRACT

A device which is convertible between a motorcycle trailer, a motorcycle sidecar and a snowmobile trailer. The device is provided with brakes when used in conjunction with a motorcycle.

6 Claims, 3 Drawing Sheets

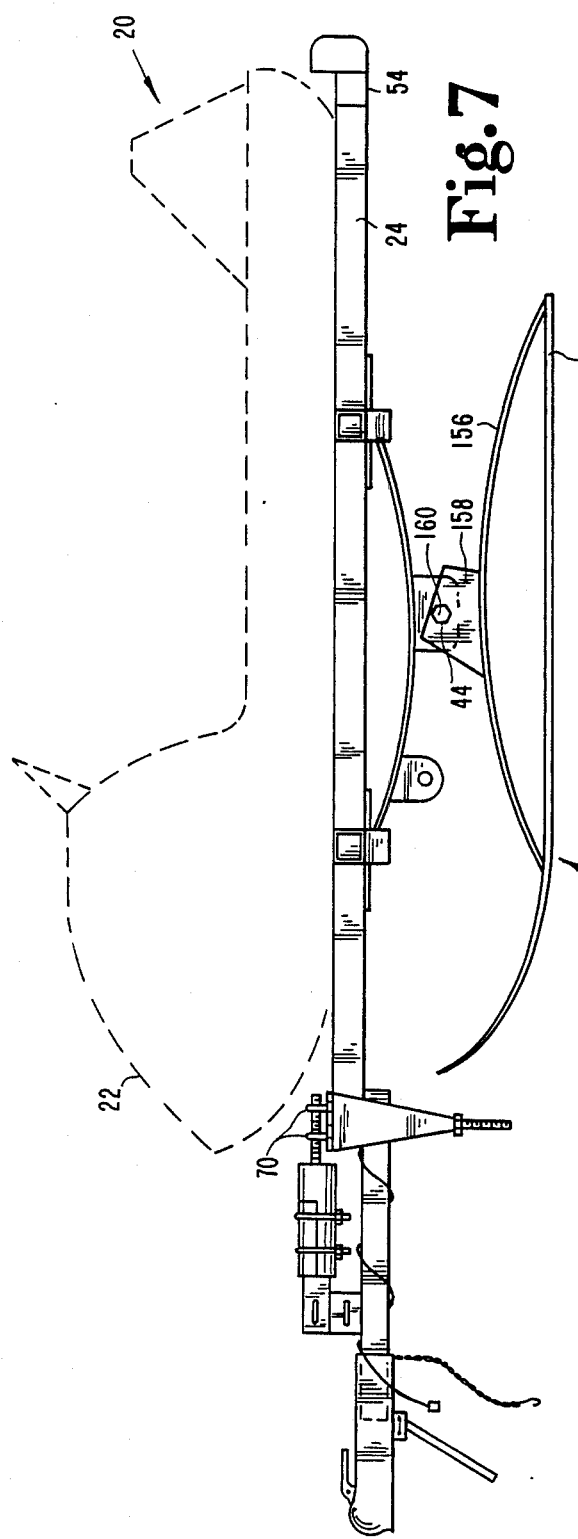
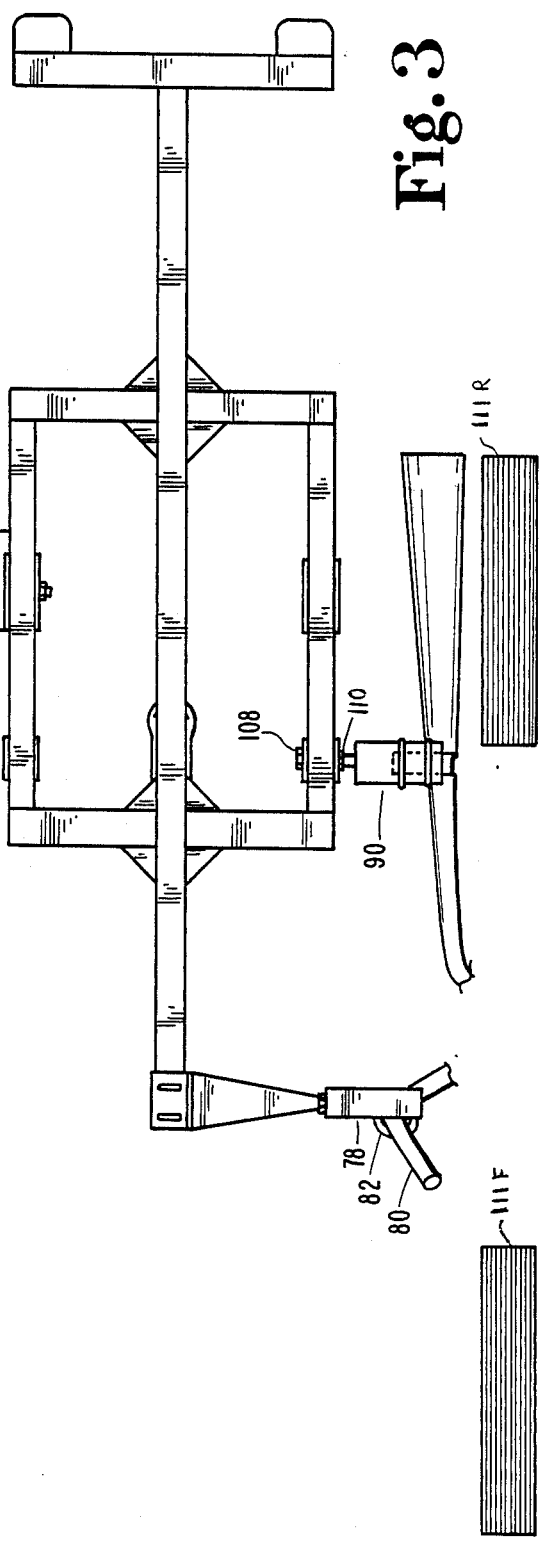

CONVERTIBLE SIDECAR/TRAILER

BACKGROUND OF THE INVENTION

1. Field of the Invention

This invention relates to a motorcycle trailer which can be converted to a motorcycle sidecar by removal of a wheel which may serve as a spare for the motorcycle and which may also be converted to a snowmobile trailer by removal of both wheels and replacement of the wheels with ski attachments.

2. Description of the Prior Art

To Applicant's knowledge, snowmobile and motorcycle enthusiasts are currently faced with the prospect of purchasing three separate attachments: a trailer for their snowmobile, a trailer for their motorcycle and a sidecar for their motorcycle. Most commercially available trailers for motorcycles (e.g. the Shoreline Deluxe Trailer offered by Sears Roebuck and Company, page 38 of Sears Specialog ® 1986-87) and sidecars for motorcycles (e.g. Terraplane ® offered by Sears Roebuck and Company, page 3 Specialog 1986-87) use wheels that are smaller in diameter than the wheels of motorcycles to which they are to be attached. Thus, on long motorcycle trips wherein a sidecar or motorcycle trailer is to be used, it is necessary to carry spare tires or inner tubes for both the trailer or sidecar and the motorcycle. Without these spares, motorcyclists must risk the possibility of damaging a rim by continuing a trip on a deflated tire or risk leaving the motorcycle or trailer or sidecar on the side of the road while a replacement tire is obtained. As a result, either valuable storage space is lost with the standard trailers and sidecars, or motorcyclists must risk substantial economic loss which may result from rim damage from driving on a flat or possible theft from leaving the motorcycle unattended while a replacement tire is obtained. Additionally, these commercially available sidecars and trailers typically do not incorporate a braking system which is controlled by the braking system of the motorcycle to which they are to be attached. Since a fully loaded trailer or sidecar can weigh as much or more than the motorcycle pulling the trailer or sidecar, extra stress is put on the braking system of the motorcycle and the stopping distance of the motorcycle may be greatly increased when a trailer or sidecar is used in conjunction with the motorcycle.

The following are patents which are believed to be relevant to the invention disclosed herein. Some references may be more relevant than others. Patent references known to the Applicant are as follows:

| Patent No. | Inventor | Issue Date |
| --- | --- | --- |
| 1,203,612 | Harley | Nov. 7, 1916 |
| 1,220,247 | Lydamore et al. | Mar. 27, 1917 |
| 4,471,973 | Beckman | Sep. 18, 1984 |

Harley discloses a motorcycle sidecar with a wheel that is removable for use as a spare for the motorcycle. The Harley invention would require that the sidecar be detached from the motorcycle and be left, apparently at the side of the road, in the event that the wheel from the sidecar needs to be used to replace a wheel on the motorcycle.

Lydamore et al. discloses a motorcycle sidecar with runners instead of wheels for operation on snow. Lydamore is cited as being of interest to the concept of replacing wheels on a trailer with runners for use on snow.

Beckman discloses a ball-type trailer hitch for use with a motorcycle. This type of trailer hitch may be used in the disclosed device.

SUMMARY OF THE INVENTION

One embodiment of the present invention is a device which may be used as a trailer for a motorcycle or a snowmobile and may also be converted to be used as a sidecar for a motorcycle. The device has a compartment for storage of cargo or for use as a passenger compartment. The compartment is bolted to, or otherwise suitably mounted to, a frame. The proximate end of the frame is designed to have a trailer hitch bolted thereto for use when the device is used as a trailer. Also attached to the proximate end is a hinged bracket having a threaded bolt extending beyond the end of the bracket for use in attachment of the device when used as a sidecar. When used as a trailer, the bracket hangs vertically down from the left side of the center member (or the right side if the sidecar is to be used in the European style). When the device is used as a sidecar, the hinged bracket is rotated to extend substantially horizontally. The bolt on the hinged bracket is screwed into a threaded nut in an attachment member which is clamped to the skidguard of the motorcycle by U-clamps. The use of the threaded bolt on the bracket and the threaded nut in the attachment members allows for proper alignment of the wheel of the device with the motorcycle wheels when used as a sidecar. A rear attachment member, designed to clamp around the rear foot peg of the motorcycle, is attached in a U-shaped bracket on the leaf spring positioned to ensure that the wheel of the sidecar is positioned longitudinally at the same point as the rear wheel of the motorcycle. The entire device is designed so that the two attachment members may be held on the hitch portion of the device while the device is being used as a trailer and then be removed for use when the device is being converted to a sidecar. Two leaf springs are attached on opposite sides of the frame of the trailer to a pair of crossmembers. U-shaped brackets are mounted at the center of the leaf springs with holes therethrough for bolting wheels or skis to the device. The wheels which are bolted to the device are the same size as the wheels of the motorcycle to which the device is to be attached, thereby allowing one of the wheels to be used as a spare in the event that the motorcycle wheel is broken. Attached to the trailer are wires or lines designed to connect to the motorcycle's braking system and thereby engage brakes on the trailer or sidecar in conjunction with the brakes of the motorcycle being engaged. Attached to the distal end of the frame is a lighting system which is connected to a wiring harness for attachment to the motorcycle's lighting system.

One object of the present invention is to provide a device which may be used as a trailer for a snowmobile, a trailer for a motorcycle and a sidecar for a motorcycle, thereby reducing the cost to motorcyclists and snowmobilists for attachments to their vehicles.

Another object of the present invention is to provide a motorcycle trailer with a removable wheel which may be used as a spare for the motorcycle and which may be converted to a sidecar in order to prevent the necessity of leaving either the motorcycle or trailer unattended at the side of a road in the event that there is damage to one of the wheels of the trailer of the motorcycle.

Related objects and advantages of the present invention will be apparent from the following description.

BRIEF DESCRIPTION OF THE DRAWINGS

FIG. 3 is a top plan view of the device in a second configuration for use as a sidecar for a motorcycle which is also partially illustrated.

FIG. 7 is a side plan view of the device in a third configuration for use as a trailer for a snowmobile.

DESCRIPTION OF THE PREFERRED EMBODIMENT

Figure 1:
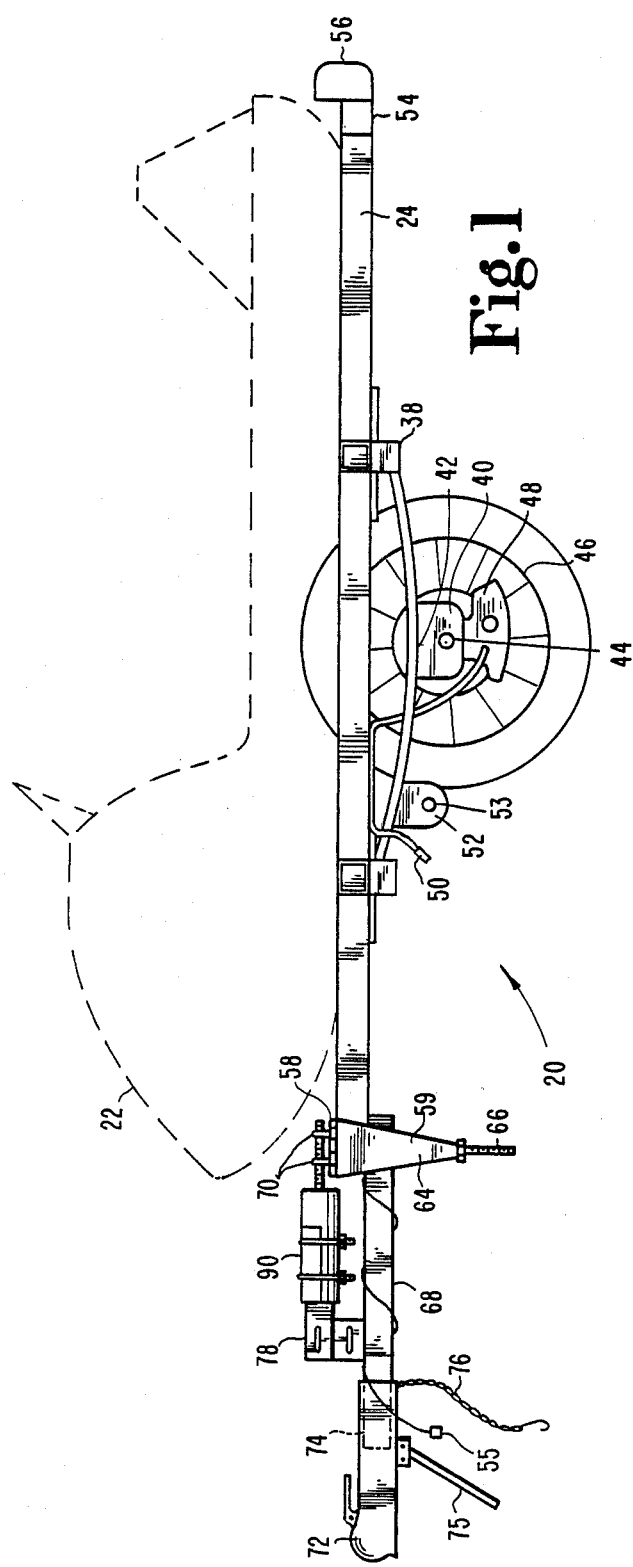
FIG. 1 is a side plan view of a device in accordance with the present invention with the left wheel removed to reveal greater detail. The device would be in a first configuration for use as a motorcycle trailer if the left wheel were attached.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
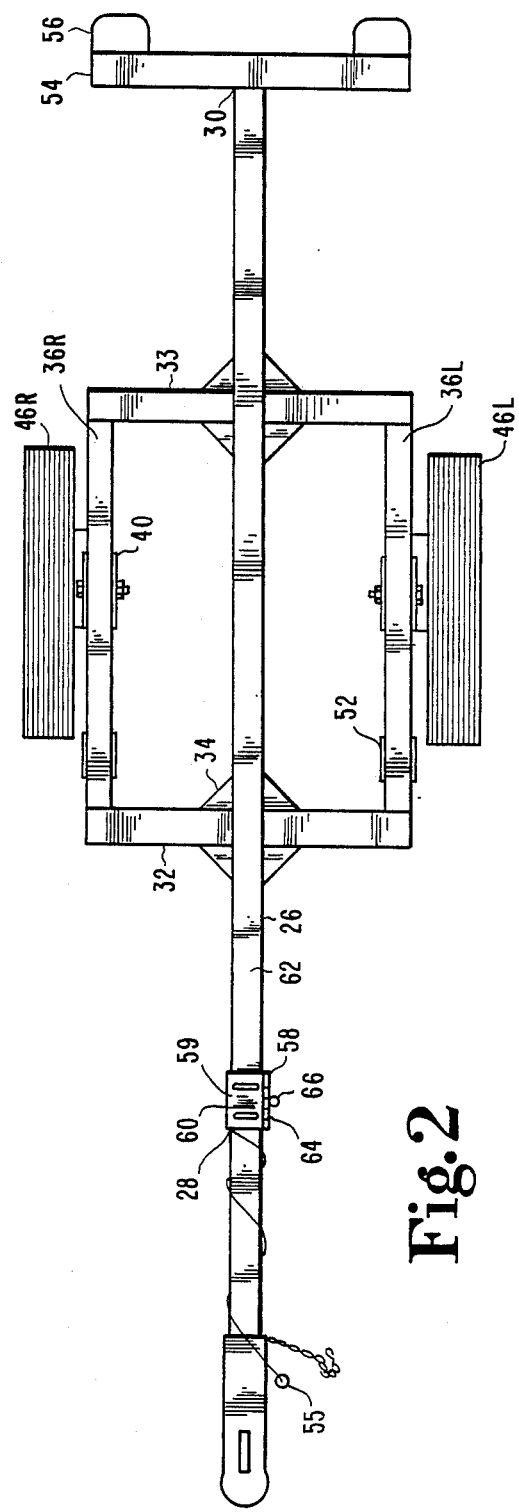
FIG. 2 is a top plan view of the device in a first configuration with the storage compartment removed.

Referring to FIG. 1, there is illustrated a device 20 which is convertible to be used as a sidecar for a motorcycle, a trailer for a motorcycle, or a trailer for a snowmobile. Device 20 includes a compartment 22 for carrying cargo or passengers. Compartment 22 is illustrated in dotted lines to allow more detail of the device to be seen. Compartment 22 may be a motorcycle sidecar body or, as used in the original design, a modified body of a snowmobile or a snowmobile trailer. Compartment 22 is attached to frame 24 by any appropriate means, such as by bolting the compartment 22 to the frame 24. Frame 24 has a longitudinal central member 26 (FIG. 2) having a proximate end 28 and a distal end 30. A plurality of front crossmembers 32 and middle crossmembers 33 extend rectilinearly from the longitudinal central member 26 on opposite sides of the longitudinal central member. Support plates 34 are bolted, riveted or welded to longitudinal central member 26 and crossmembers 32 and 33 for reinforcement. A pair of leaf springs 36L and 36R ("L" and "R" are used herein to designate left and right as defined when looking from the distal end 30 toward the proximate end 28) extend parallel to and on opposite sides of longitudinal central member 26 and are attached to the front crossmembers 32 and middle crossmembers 33 by brackets 38 or welding. U-shaped brackets 40 are attached to the lowermost point 42 of the leaf springs 36. Attachment holes 44 are provided for bolting wheels 46 and brakes 48 to the frame. Wheels 46 are designed and arranged to serve as spares for the motorcycle to which the trailer or sidecar is to be attached. Brakes 48 are designed to be attached to the main braking system of the motorcycle to which the trailer or sidecar is to be attached by braking system 50 to be described later in more detail. Brakes 48 are the same as the brakes on the motorcycle to which the device is to be attached. Since applicant owns a Harley-Davidson ® motorcycle, brakes 48 are mounted to U-shaped bracket 40 with a Harley-Davidson ® brake hanger part no. 130449. It is envisioned that a different brake and hanger may be used which will correspond to the type of motorcycle to which device 20 will be attached. Also attached to leaf springs 36 are second U-shaped brackets 52 with attachment holes 53 therethrough. Second U-shaped brackets 52 are appropriately positioned on the leaf springs to allow an attachment rod to attach the sidecar to the rear footpeg of the motorcycle.

Attached to the distal end 30 of the longitudinal central member 26 is a rear crossmember 54 which has lights 56 mounted thereon. Lights 56 are connected to wiring harness 55 which is connectable to the lighting system of the motorcycle to which the sidecar or trailer is to be attached so as to provide brakelights, taillights, and turn signals.

Attached near the proximate end 28 of the longitudinal central member 26 is a hinge 59 with a first plate 60 welded, riveted or bolted horizontally to the top 62 of longitudinal central member 26. The second plate 64 of the hinge 59 remains in a vertical position on the left side of the device 20 when the device is used as a trailer and extends substantially horizontally at right angles to longitudinal central member 26 to provide for an attachment means when the device 20 is used as a sidecar. Second plate 64 and first plate 60 are hingedly connected by hinge portion 58. Attached to and extending beyond second member 64 of hinge 59 is a threaded bolt 66 which is used in attaching the device 20 as a sidecar. A tongue 68 is bolted to the proximate end 28 of the longitudinal central member 26 by eyebolts 70 which pass through the longitudinal central member 26 and the tongue near the proximate end of the longitudinal central member. A ball-type coupler 72 is bolted or welded to the proximate end 74 of tongue 68. It should be understood that a suitable ball-type trailer hitch will be mounted to the frame of the motorcycle or snowmobile to which device 20 will be attached. The use of a ball-type trailer hitch and a ball coupler provides sufficient relative rotational motion between the trailer and the motorcycle or snowmobile so that snowmobile or motorcycle can be operated in the normal manner even when device 20 is attached thereto as a trailer. A safety chain 76 is also attached to the tongue portion for attachment to the motorcycle or snowmobile when the device 20 is used as a trailer. A kickstand 75 is also provided for the tongue 68 so that the tongue 68 will not have to rest directly on the ground when device 20 is not connected to a motorcycle.

Figure 4:
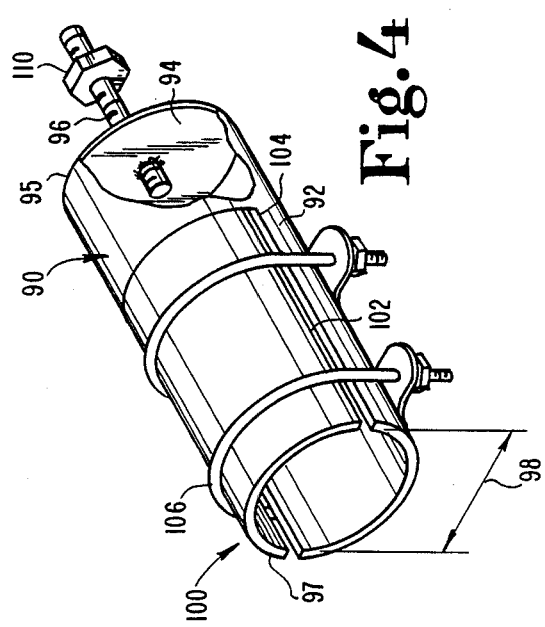
FIG. 4 is a perspective view of a rear attachment member used to attach the device as a sidecar.
Figure 5:
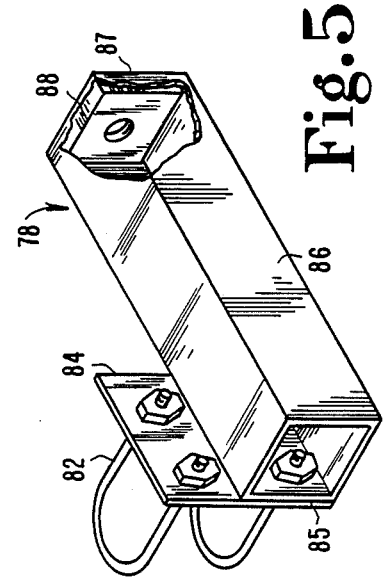
FIG. 5 is a perspective view of a front motorcycle attachment member used to attach the device as a sidecar.

Referring now to FIGS. 3, 4 and 5, there is further illustrated those elements which are used in converting the device to use as a motorcycle sidecar. In describing the conversion of device 20 to a second configuration for use as a motorcycle sidecar, the left side of device 20, as defined in looking from the distal end to the proximate end, will be described as the side of device 20 which will be attached to the motorcycle. However, it should be understood that the description would also apply to the situation in which the right side would be attached to the motorcycle as is commonly done in Europe. As can be seen, both leaf springs 36L and 36R have U-shaped brackets 42 and second U-shaped brackets 52 attached thereto.

Prior to attaching device 20 as a sidecar, the left wheel 46L (FIG. 2) is removed from device 20 by removal of the axle bolt that holds the wheel to the U-shaped bracket 42. Second member 64 of hinge 58 is raised to be in a horizontal position as illustrated in FIG. 3. A front attachment member 78 is attached to the skidbar 80 of the motorcycle to which device 20 is to be attached by means of C-clamps 82 which extend through holes in plate 84 (FIG. 5) attached to the first end 85 of the front attachment member. For motorcycles without skidguards, a suitable front attachment member can be designed to allow for direct attachment to the frame of the motorcycle. A piece of rubber sheeting may be wrapped around the skidguard prior to clamping the front attachment member thereto, to prevent rubbing or chafing of the skidguard. Front attachment member 78 consists of a square tubular body 86 which extends from the motorcycle skidguard to the threaded bolt 66 in the hinge 59 (FIG. 3). The square tubular body 86 has a nut 88 (FIG. 5) welded into the second end 87 of square tubular body 86. Nut 88 is sized to receive the threaded bolt 66. The use of this threaded bolt and nut arrangement allows for adjustment of the front of the device 20 when used as a sidecar to ensure that the right wheel 46R is in correct alignment with the front wheel IIIF and rear wheel IIIR of the motorcycle. This alignment is accomplished by rotation of the front attachment member 78 until correct alignment is obtained and then front attachment member 78 is clamped to the skidrail 80 of a motorcycle.

Rear attachment member 90 (FIGS. 3 and 4) has a tubular body 92 with a plate 94 welded in one end 95. A bolt 96 sized to be received in attachment holes 53 in the second U-shaped attachment bracket 52 is welded into the center of the plate 94. Tubular body 96 has an inside diameter 98 approximating the outside diameter of a footpeg of a motorcycle. A semi-cylindrical section 100 is cut out of the opposite end 97 of tubular body 92 from the plate 94. The semi-cylindrical section 100 is approximately the same length as the rear footpeg of a motorcycle. A slight portion of the metal of the semi-cylindrical section 100 along the longitudinal cut 102 is removed so that replacement of the semi-cylindrical section 100 into the tubular body 92 would result in a gap 104 between the tubular body and the semi-cylindrical section. The rear footpeg of the motorcycle is inserted in the tubular body 92 and the semi-cylindrical section 100 is put back in place in tubular 92. Clamps 106 are then clamped around the semi-cylindrical section 100 and the tubular body 92 and tightened so as to squeeze the footpeg of the motorcycle tightly by closing gap 104 and thereby securing the rear attachment member 90 to the motorcycle. Standard muffler clamps may be used for clamp 106. Bolt 96 is inserted in attachment holes 53 in the U-shaped attachment bracket 52 of the device 20 and a nut 108 is screwed onto the bolt 96 to sandwich the U-shaped bracket 52 between nut 108 and nut 110 located on bolt 96 (FIG. 3). As previously discussed, U-shaped bracket 52 is located on the left leaf spring 36L in a position to ensure that the right wheel 46R of device 20 is directly opposite the rear wheel IIIR of the motorcycle. This placement allows for better handling of the motorcycle when device 20 is attached thereto as a sidecar. Should the motorcyclist desire to remove the rear footpeg from the motorcycle, it is envisioned that a single bolt could be used as a rear attachment means. However, the illustrated rear attachment member 90 is preferred because its use does not require removal of the footpeg.

When used as a trailer, device 20 is hooked to a ball hitch attached to the rear of the motorcycle or snowmobile by an appropriately designed ball hitch. Upon attachment of device 20 to a motorcycle as either a trailer or a sidecar, wiring harness 55 is plugged into the motorcycle's lighting system to provide for rear taillights, turn signals and brake lights in an ordinary and customary fashion. Additionally, braking system 50 is connected to the motorcycle's braking system to ensure that the brakes of the trailer or sidecar operate in conjunction with braking of the motorcycle.

Figure 6:
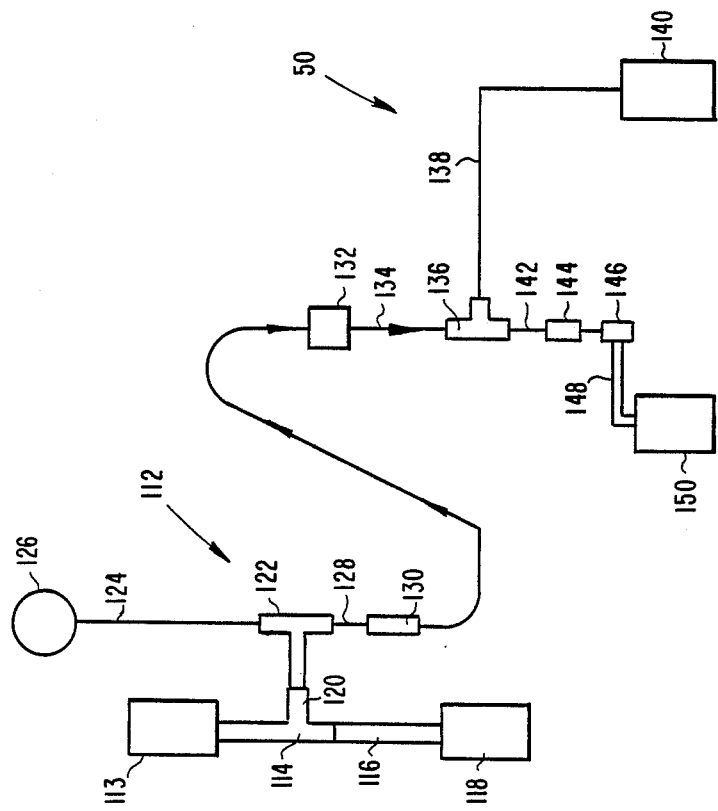
FIG. 6 is a schematic view of a brake system for the device additionally showing the modifications necessary to the motorcycle brake system.

Referring to FIG. 5, the braking system 50 is schematically illustrated. Also illustrated in FIG. 6 are appropriate adjustments to be made to the motorcycle braking system 112. The current invention envisions the use of either an electrical, mechanical or hydraulic brake system with the hydraulic brake system being preferred to the electrical or mechanical brake system. The hydraulic brake system will reduce the load on the motorcycle's electrical system. Thus the preferred embodiment, the hydraulic brake system, is illustrated with the understanding that an electrical or mechanical brake system would come within the scope of the invention.

In order to accommodate the use of a trailer or sidecar with brakes, the braking system 112 of the motorcycle must be modified. Modification of the braking system 112 of the motorcycle incorporates the use of a standard T-fitting 114 inserted in the brakeline 116 of the motorcycle near the master brake cylinder 113. The motorcycle brake branch 116 of T-fitting 114 leads to the rear brake 118 of the motorcycle. The device brake branch 120 of the T-fitting 114 leads to a second T-fitting 122 with a gauge branch 124 leading to a hydraulic pressure gauge 126. The device brake branch 128 leads to a quick disconnect shutoff valve 130. The quick disconnect shutoff valve 130 is of standard design of the type that would ensure that during disconnection of a line leading thereto, that no fluid would be lost from the system. The braking system 50 of the device 20 has a connector 132 for connection into the quick disconnect shutoff valve 130 on the motorcycle. Quick disconnect shutoff valve 130 and connector 132 are commercially available. Applicant uses a series THK1 from the Tumco Division of CSP, Inc., in Cleveland, Ohio. The brake line 134 of the braking system 50 leads to a first T-fitting 136. The right brake branch 138 of first T-fitting 136 leads directly to the right brake 140 of the device 20. The left brake branch 142 leads to a second quick disconnect shutoff valve 144 which is connected by an appropriate connector 146 connected to the left brake line 148 leading to the left brake 150.

When the device 20 is used as a motorcycle trailer, both the left brake and the right brake of the trailer are connected to the rear brake of the motorcycle. Thus, connector 132 is connected to quick shutoff valve 130 and the valve is opened, and connector 146 is connected to quick shutoff valve 144 and the valve is opened. When the device 20 is to be used as a sidecar, connector 146 is disconnected from quick shutoff valve 144 and the valve is closed.

The following is a brief description of the operation of an electrical or mechanical brake system for use with device 20. If electrical brakes are to be used on the device, the device brakes will be connected to the stop light switch on the motorcycle by means of any commonly available wiring harness. Brakes which are actuatable by an electrical impulse will be incorporated in the device 20 to replace the hydraulically actuated brakes referred to previously. Thus, when the brake light of the motorcycle comes on, the brakes of the device will be actuated. Upon removal of the left wheel of the device 20, the left brake will be disconnected by disconnection of a wiring harness thereto, but the right brake will still operate.

If mechanical brakes are used, a cable will be connected to the rear brake pedal of the motorcycle. The cable will be connected to mechanical brakes on device 20. The cable will be the same type as is commonly used on motorcycles with mechanical brakes, and will thus be capable of actuating the brakes on the device when the rear brake pedal of the motorcycle is depressed.

The braking system was incorporated into the invention by Applicant because of the fact that trailers and sidecars often carry as much or more weight than the motorcycle to which they are connected. Thus, typically upon connection of a trailer or sidecar to the motorcycle, the braking distance of the motorcycle is greatly increased and the strain on the motorcycle's brakes is increased. Applicant's invention decreased the strain on a motorcycle's brakes which would otherwise result if a sidecar or trailer were attached to the motorcycle.

Other advantages of Applicant's invention are apparent from the following. As can be seen from FIG. 1, the rear attachment member 90 can be secured to the tongue of the device 20 when used as a trailer. In order to secure the front member, bolt 96 is inserted through eyebolt 70 and nut 108 is then placed on the end of the bolt 96. Additionally, front attachment member 78 is sized to be received within rear attachment member 90 and may be held in place by tightening the muffler clamps 106. This facilitates conversion of device 20 from motorcycle trailer to motorcycle sidecar in the event of an emergency. And, as can be seen in FIG. 3, the hitch portion is bolted to the proximate end of the longitudinal center member and is designed to be held beneath the longitudinal center member when the device is used as a sidecar to prevent forward protrusion beyond the proximate end of the frame.

FIG. 7 illustrates the device 20 in a third configuration for use as a trailer for a snowmobile. As can be seen from the drawing, in order to use the device 20 as the trailer for a snowmobile, the wheels 46 and brakes 48 are removed from the trailer and skis 152 are bolted into hole 44 in attachment bracket 42.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle attachment for attachment to a motorcycle and a snowmobile comprising:
   a storage compartment designed and arranged to contain cargo, said compartment being of sufficient size to allow a person to be seated therein;
   a frame attached to said storage compartment, said frame having a proximate end, a distal end, a first side, defined as that side of the frame which would be adjacent to said motorcycle when said vehicle attachment is used as a sidecar, and a second side opposite said first side; and
   configuration conversion means for converting the configuration of said vehicle attachment between a first configuration wherein said storage compartment and said frame are designed and arranged to be a trailer for a motorcycle, a second configuration wherein said storage compartment and said frame are designed and arranged to serve as a sidecar for a motorcycle and a third configuration wherein said storage compartment and said frame are designed and arranged to serve as a trailer for a snowmobile, said configuration conversion means comprising:
   a first ground engaging wheel designed and arranged to serve as a spare wheel for the motorcycle to which the vehicle attachment is to be attached, said first wheel being removably attachable to said first side of said frame so that said wheel is attached to said first side of said frame when said configuration conversion means is in said first configuration and so that said first wheel is not attached to said first side when said configuration conversion means is in said second configuration or in said third configuration;
   a second ground engaging wheel, said second wheel being removably attachable to said second side of said frame so that said wheel is attached to said second side of said frame when said configuration conversion means is in said first configuration and said second configuration, and so that said second wheel is not attached to said second side when said configuration conversion means is in said third configuration;
   a plurality of ground engaging skis designed and arranged to be removably attachable to the first side and the second side of said frame, said skis being attached to said first side and said second side of said frame when said configuration conversion means is in said third configuration, and said skis not being attached to said second side when said configuration conversion means is in said first configuration and said second configuration;
   convertible attachment means for attaching said vehicle attachment to the motorcycle or snowmobile, said convertible attachment means being convertible between a trailer attachment means when said configuration conversion means is in said first or third configuration and a sidecar attachment means when said configuration conversion means is in said second configuration, said convertible attachment means comprising:
   a tongue portion removably attached to said proximate end of said frame, said tongue portion extending beyond said proximate end of said frame when said configuration conversion means is in said first or third configuration;
   a forward sidecar attachment means attached to said frame for attaching said vehicle attachment to the side of a motorcycle, said forward sidecar attachment means comprising:
   a bracket attached to said proximate end of said frame, said bracket having a first plate and a second plate, said first plate being secured to said proximate end of said frame, said second plate extending substantially horizontally from said proximate end when said configuration conversion means is in said second configuration;

a motorcycle attachment member designed and arranged to be securely but removably attachable to said motorcycle; and an adjustable connector designed and arranged to properly align said second wheel of said vehicle attachment with the wheels of said motorcycle, said adjustable connector being attached to said bracket and said motorcycle attachment member; and a rear sidecar attachment means attached to said frame for attaching said vehicle attachment to the side of a motorcycle.

2. The vehicle attachment of claim 1 wherein said configuration conversion means further comprises a brake means for braking said vehicle attachment when said configuration conversion means is in said first or second configuration, said brake means having a second brake positioned relative to said second ground engaging wheel to provide braking action to said second wheel and said brake means being connectable to the brake system of the motorcycle to which the vehicle attachment is to be attached to allow said brake means to coact with the brake system of the motorcycle.

3. The vehicle attachment of claim 2 wherein said brake means further comprises a first brake positioned relative to said first ground engaging wheel to provide braking action to said first wheel when said configuration conversion means is in said first configuration, said first brake being removable from said vehicle attachment when said vehicle attachment is in said second configuration and said third configuration.

4. A vehicle attachment for attachment to a motorcycle comprising:

a storage compartment;

a frame attached to said storage compartment, said frame having a proximate end, a distal end, a first side, defined as that side of the frame which would be adjacent to said motorcycle when said vehicle attachment is used as a sidecar, and a second side opposite said first side; and configuration conversion means for converting the configuration of said vehicle attachment between a first configuration wherein said storage compartment and said frame are designed and arranged to be a trailer for a motorcycle, a second configuration wherein said storage compartment and said frame are designed and arranged to serve as a sidecar for a motorcycle, said configuration conversion means including:

a first ground engaging wheel;

a second ground engaging wheel; and convertible attachment means for attaching said vehicle attachment to the motorcycle, said convertible attachment means being convertible between a trailer attachment means when said configuration conversion means is in said first configuration and a sidecar attachment means when said configuration conversion means is in said second configuration, said convertible attachment means comprising:

a tongue portion attached to said proximate end of said frame, said tongue portion extending beyond said proximate end of said frame when said configuration conversion means is in said first;

a forward sidecar attachment means attached to said frame for attaching said vehicle attachment to the side of a motorcycle, said forward sidecar attachment means comprising:

a bracket attached to said proximate end of said frame, said bracket having a first plate and a second plate, said first plate being secured to said proximate end of said frame, said second plate extending substantially horizontally from said proximate end when said configuration conversion means is in said second configuration;

a motorcycle attachment member designed and arranged to be securely but removably attachable to said motorcycle; and an adjustable connector designed and arranged to properly align said second wheel of said vehicle attachment with the wheels of said motorcycle, said adjustable connector being attached to said bracket and said motorcycle attachment member; and a rear sidecar attachment means attached to said frame for attaching said vehicle attachment to the side of a motorcycle.

5. The vehicle attachment of claim 4 wherein said configuration conversion means further comprises a brake means for braking said vehicle attachment, said brake means having a second brake positioned relative to said second ground engaging wheel to provide braking action to said second wheel and said brake means being connectable to the brake system of the motorcycle to which the vehicle attachment is to be attached to allow said brake means to coact with the brake system of the motorcycle.

6. The vehicle attachment of claim 5 wherein said brake means further comprises a first brake positioned relative to said first ground engaging wheel to provide braking action to said first wheel when said configuration conversion means is in said first configuration, said first brake being removable from said vehicle attachment when said vehicle attachment is in said second configuration.

* * * * *